US008548856B2

(12) United States Patent  
Maruszak

(10) Patent No.: US 8,548,856 B2  
(45) Date of Patent: Oct. 1, 2013

(54) APPARATUS, SYSTEM AND METHOD FOR PROVIDING A SIGNAL TO REQUEST GOODS AND/OR SERVICES

(76) Inventor: Marie Maruszak, Hammond, IN (US)

(*) Notice: Subject to any disclaimer, the term of this patent is extended or adjusted under 35 U.S.C. 154(b) by 1608 days.

(21) Appl. No.: 11/589,559

(22) Filed: Oct. 30, 2006

(65) Prior Publication Data

US 2008/0103915 A1     May 1, 2008

(51) Int. Cl.
*G06Q 30/00*   (2012.01)
*G06Q 50/00*   (2012.01)
*G06F 3/00*    (2006.01)

(52) U.S. Cl.
USPC ............................................. 705/15; 715/761

(58) Field of Classification Search
USPC .......................................... 705/15, 22, 26, 28
See application file for complete search history.

(56) References Cited

U.S. PATENT DOCUMENTS

| | | |
|---|---|---|
| 3,925,779 A | 12/1975 | Gerstenhaber |
| 4,004,274 A | 1/1977 | Menke et al. |
| 4,075,621 A | 2/1978 | Salmon |
| 4,303,915 A | 12/1981 | D'Angelo et al. |
| 4,777,488 A | 10/1988 | Carlman, Jr. et al. |
| 4,875,158 A | 10/1989 | Ashkin et al. |
| 4,935,720 A | 6/1990 | Kalfoun |
| 5,283,595 A | 2/1994 | Krukovsky |
| 5,302,970 A | 4/1994 | Lakso et al. |
| 5,355,115 A | 10/1994 | Goor et al. |
| 5,568,786 A | 10/1996 | Lynch et al. |
| 5,699,039 A | 12/1997 | Korzen |
| 5,828,294 A | 10/1998 | Shank |
| 5,870,110 A | 2/1999 | Mallory |
| 5,881,890 A * | 3/1999 | Wiley ............................ 209/703 |
| 5,974,393 A | 10/1999 | McCullough et al. |
| 6,341,871 B1 | 1/2002 | Angelopoulos |
| 6,366,196 B1 | 4/2002 | Green et al. |
| 6,435,690 B1 | 8/2002 | Till |
| 6,519,463 B2 | 2/2003 | Tendler |
| 6,570,583 B1 | 5/2003 | Kung et al. |
| 6,711,005 B2 | 3/2004 | Martin |
| 6,753,788 B1 | 6/2004 | Munyon |
| 6,782,974 B2 | 8/2004 | Leifer |
| 6,796,673 B1 | 9/2004 | Dempsey et al. |
| 6,880,750 B2 | 4/2005 | Pentel |
| 6,928,297 B2 | 8/2005 | Kitamura et al. |
| 7,237,252 B2 * | 6/2007 | Billmaier ........................ 725/43 |
| 7,418,413 B1 * | 8/2008 | Benson ........................... 705/27 |
| 7,422,148 B2 * | 9/2008 | Barton et al. .................. 235/383 |
| 2002/0187805 A1 | 12/2002 | Song |
| 2003/0009381 A1 * | 1/2003 | Mattson ......................... 705/15 |
| 2003/0025476 A1 | 2/2003 | Trela |
| 2003/0227425 A1 | 12/2003 | McKay |

* cited by examiner

*Primary Examiner* — Seye Iwarere
(74) *Attorney, Agent, or Firm* — Patents+TMS, P.C.

(57) ABSTRACT

An apparatus, a system and a method for displaying a visual signal that requests a good and/or service are provided. The system and the method have a communication device having a screen to display a signal that requests the good and/or the service. The signal may be, for example, a logo, a text, a picture, a color, and/or a shape. The signal may describe, characterize or otherwise relate to the good and/or the service requested by a user. Further, the communication device may access, connect to and/or be in communication with a database storing the signal. The communication device may input information into the database relating to a user of the communication device. The communication device may design, modify and/or transmit the visual using a server and/or a network. The communication device may have a memory for storing and/or accessing the signal. The screen of the communication device may emit the signal.

20 Claims, 5 Drawing Sheets

APPARATUS, SYSTEM AND METHOD FOR PROVIDING A SIGNAL TO REQUEST GOODS AND/OR SERVICES

BACKGROUND OF THE INVENTION

The present invention generally relates to an apparatus, a system and a method for displaying a signal to request goods and/or services. The signal may be, such as, for example, a visual signal and/or audio signal. A user may display, transmit and/or design the visual signal with a communication device. The communication device may access a database to design, to select, to display and/or to transfer the visual signal to the device. The visual signal may identify, describe and/or contain characteristics of the good or the service and may be displayed by the communication device. As a result, the good and/or the service may be displayed by the communication device to request the good or the service.

It is, of course, generally known for a patron of an establishment, such as, for example, a restaurant, a bar, a sports stadium, a banquet hall, a cocktail lounge or the like to request goods or request services orally to an employee of the establishment. The employee of the establishment must, therefore, attend to each patron to obtain information regarding the good or the service the patron is requesting. If the patron desires the good and/or the service when the employee is preoccupied and/or at a location remote from the patron, the patron must obtain the attention of the employee by, for example, whistling, pointing, waiving a hand, raising a voice or asking a second employee of the establishment for the attention of a first employee. Requesting the good and/or the service by first requiring the employee to attend to each patron individually is inefficient. For example, the employee is required to return to the patron and obtain the request of the patron before obtaining the good and/or the service the patron is requesting. In addition, the patron is prevented from enjoying the ambiance of the establishment because the patron is required to gain the attention of the employee each time the patron requests the good and/or the service. Furthermore, the patron is frequently interrupted by the employee each time the patron requests the good or the service; as a result, the patron is prevented from effectively conversing with a second patron of the establishment. Moreover, the employee may have difficulty hearing the patron requesting the good and/or service when the establishment is noisy and/or overcrowded. As a result, the employee may offer and/or obtain a good and/or a service different from the good and/or service requested by the patron.

A need, therefore, exists for an apparatus, a system and a method for requesting goods and/or services by displaying a visual signal. Additionally, a need exists for an apparatus that may display a visual signal to request a good and/or a service. Further, a need exists for an apparatus, a system and a method for displaying a visual signal that may describe, characterize and/or identify a good and/or a service to request the good and/or the service. Still further, a need exists for a system and a method for using an apparatus to provide access to a database to design and/or to display a visual signal which may be indicative of the good and/or the service to request the good and/or the service. Moreover, a need exists for an apparatus, a system and a method for accessing a database to design, to transfer and/or to display a visual signal to request a good and/or a service.

SUMMARY OF THE INVENTION

The present invention provides an apparatus, a system and a method for requesting a good and/or a service. More specifically, the present invention provides an apparatus, a system and a method for displaying a signal, such as, for example, a visual signal and/or an audio signal to request the good and/or the service. The system and the method may have a communication device having a screen to display, to transmit and/or to design the visual signal. The communication device may access a database to display, to design, to store and/or to transfer the visual signal to the communication device. The communication device may have a memory to store the visual signal. The visual signal may have characteristics associated with the good or the service, identify the good or the service and/or describe the good or the service. As a result, the good and/or the service may be provided to the user of the communication device.

To this end, in an embodiment of the present invention, an apparatus for transmitting a signal wherein the signal is transmitted by a user to request a good or a service wherein the good or the service is provided by a merchant wherein the user requests the good or the service by the transmission of the signal is provided. Further, the apparatus has a memory that stores a plurality of signals wherein each of the plurality of signals is associated with a corresponding the good or the service provided by the merchant. Still further, the apparatus has an input means connected to the memory wherein the user accesses the signal stored in the memory via the input means. Moreover, the apparatus has a screen for displaying the signal wherein the signal is identifiable with the good or the service wherein the signal is a visual characteristic of the good or the service and further wherein the screen transmits the signal to the merchant to provide the good or the service to the user.

In an embodiment, the apparatus has an information receptor connected to the memory where the information receptor transmits and receives the signal.

In an embodiment, the apparatus has an emitting means connected to the memory wherein the emitting means for transmitting the signal from the screen.

In an embodiment, the signal is an advertisement.

In an embodiment, the merchant is a restaurant.

In an embodiment, the apparatus has a light emitting element connected to the memory wherein the light emitting element illuminates the signal.

In another embodiment of the present invention, a system for transmitting a signal wherein the signal is displayed to request a good or a service provided by a merchant is provided. Further, the system has a communication device wherein the communication device has a screen to display the signal. Still further, the system has a server in communication with the communication device. Moreover, the system has a database connected to the server wherein the database is remote with respect to the communication device and further wherein the database stores the signal. Moreover, the system has a network in remote communication with the server wherein the server accesses the signal and further wherein the server transfers the signal between the communication device and the database wherein the signal corresponds to the good or the service and further herein the screen transmits the signal to the merchant to request the good or the service.

In an embodiment, the database categorizes the signal by a type of the good or the service.

In an embodiment, the database is searchable based on a characteristic of the good or the service.

In an embodiment, the server stores information relating to the merchant.

In an embodiment, the signal is a visual representation of a characteristic of the good or the service.

In an embodiment, the signal is viewable at a location remote from the communication device.

In an embodiment, the screen emits the visual signal to a location remote from the screen.

In another embodiment of the present invention, a method for transmitting a signal wherein the signal is displayed to request a good or a service provided by a first user wherein a second user requests the good or the service is provided. Further, the method has the step of providing a communication device with a display means to display the signal. Still further, the method has the step of accessing a server in communication with the communication device wherein the server is remote with respect to the communication device. Moreover, the method has the step of accessing a database in communication with the server wherein the database is remote with respect to the communication device. Moreover, the method has the step of storing the signal on the database wherein the signal is identifiable with the good or the service. Additionally, the method has the step of transferring the signal between the database and the communication device. Furthermore, the method has the step of transmitting the signal to the first user via the display means to request a good or a service provided by the first user wherein the good or the service is requested by the second user.

In an embodiment, the method has the step of obtaining the good or the service to the second user.

In an embodiment, the method has the step of transmitting an advertisement from the server to the communication device.

In an embodiment, the server limits access to the database based on the identity of the second user.

In an embodiment, the signal is a visual representation of a characteristic of the good or the service.

In an embodiment, the method has the step of inputting information into the database relating to the first user or the second user.

In an embodiment, the method has the step of searching information stored in the database wherein the information relating to the first user or the second user.

It is, therefore, an advantage of the present invention to provide an apparatus, a system and a method to request a good or a service by displaying a visual signal.

Another advantage of the present invention is to provide an apparatus, a system and a method for using a communication device to display, transmit and/or design a visual signal which may request a good and/or a service.

A further advantage of the present invention is to provide an apparatus, a system and a method for using a communication device to provide access to a database to select, to design and/or to transfer a visual signal to a communication device.

A still further advantage of the present invention is to provide an apparatus, a system and a method for providing access to a requested good or a requested service without oral or written communication.

Yet another advantage of the present invention is to provide an apparatus, a system and a method for using a communication device to request a good or a service by displaying a visual signal that may describe, identify and/or represent the good or the service requested.

Still further, an advantage of the present invention is to provide an apparatus, a system and a method of using a communication device to display a visual signal to allow an employee of an establishment to provide- a requested good and/or a requested service without first attending to a user of the communication device.

Another advantage of the present invention is to provide an apparatus, a system and a method for using a communication to display a visual signal indicative of a good and/or a service to allow an employee of an establishment to accurately provide the requested good and/or the requested service.

Yet another advantage of the present invention is to provide an apparatus, a system and a method for utilizing a communication device to visually communicate when other forms of communication are ineffective.

Another advantage of the present invention is to provide an apparatus, a system and a method for displaying a visual signal to obtain a requested good and/or requested service more quickly.

Still another advantage of the present invention is to provide an apparatus, a system and a method of communicated that is not limited by language or culture barriers.

Moreover, an advantage of the present invention is to provide an apparatus, a system and a method for requesting a good and/or service without disrupting a dining experience.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to an apparatus, a system and a method for displaying a signal to request goods and/or to request services. More specifically, the present invention provides a system and a method for using a communication device to request a good and/or a service by displaying a signal on a screen of the communication device. The present invention provides an apparatus, a system and a method for accessing a database to display, store, and/or design a signal. The signal may be, for example, a visual signal and/or a audio signal. The signal will hereinafter be referred to as a visual signal but should not be deemed limited to a visual signal. The communication device may have a memory to store the visual signal. The communication device may have an input means for allowing a user to communicate with a server to access the database. The database and/or the server may allow a user to design, to select and/or to display the visual signal.

Figure 1:
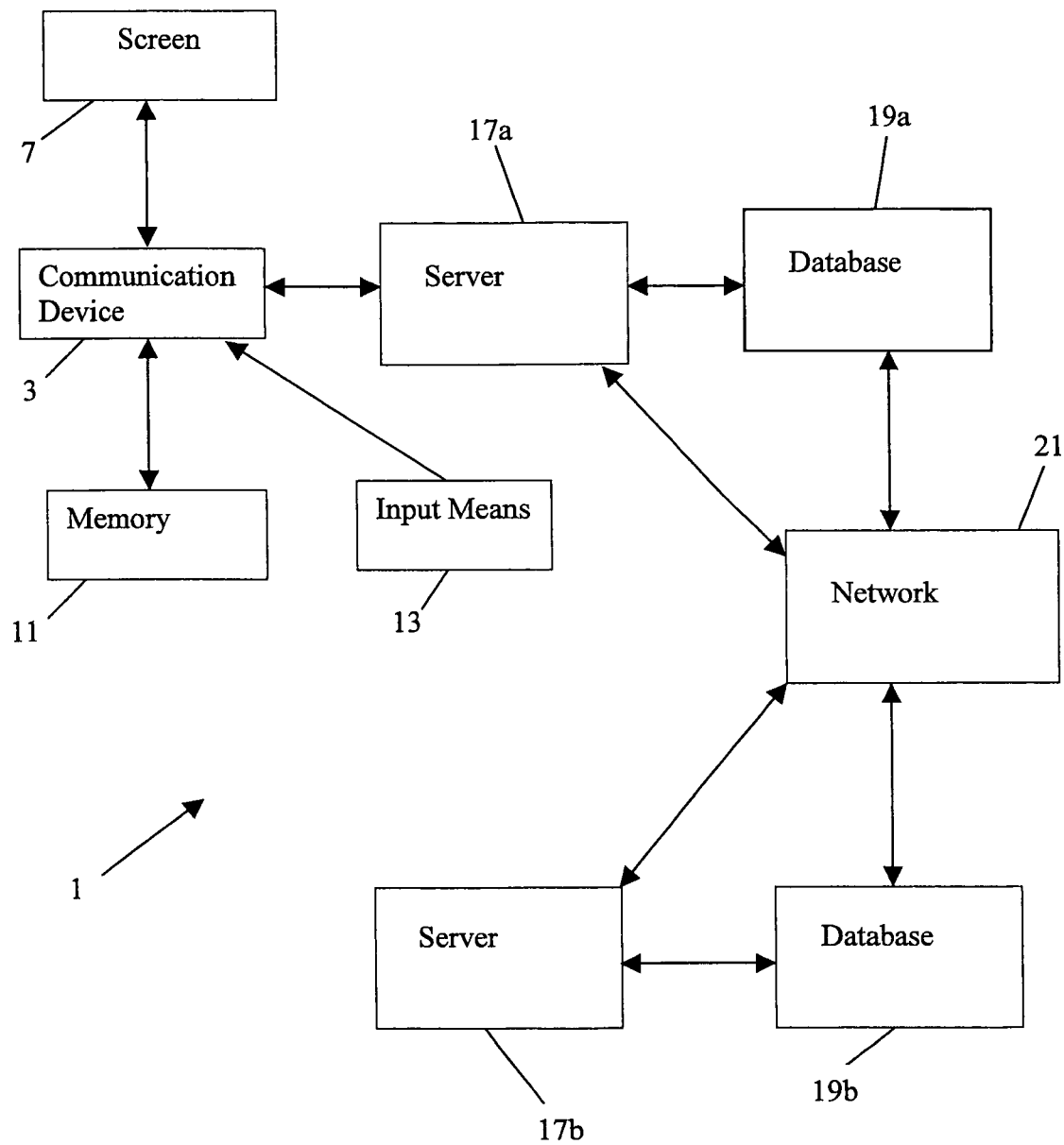
FIG. 1 illustrates a black box diagram of an apparatus and a system for accessing and communication displaying a visual signal to request a good and/or a service.
Figure 2:
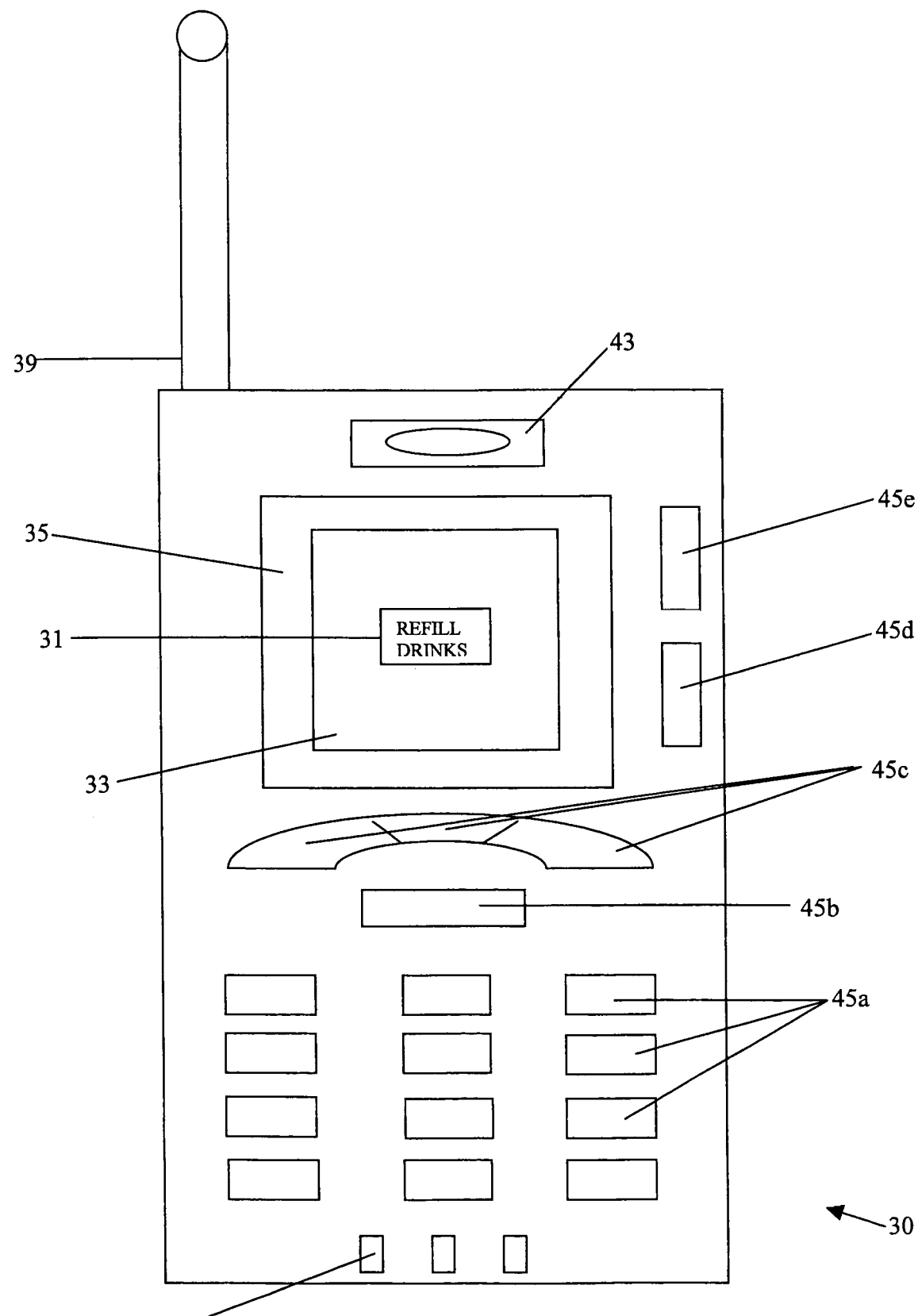
FIG. 2 illustrates an apparatus and a system of displaying a signal in an embodiment of the present invention.

Referring-now to the drawings, FIG. 1 generally illustrates a system 1 which may have a communication device 3 and/or a screen 7. The communication device 3 may be connected to, attached to and/or in communication with the screen 7. The communication device 3 may be connected to and/or in communication with a memory 11. The memory 11 may be local with respect to the communication device 3. The memory 11 may store data, such as, for example, a visual signal 31, as shown in FIG. 2. An input means 13 may be in communication with, connected to and/or attached to the communication device 3. The system 1 may have a first server 17a, a second server 17b, a first database 19a, a second database 19b, and/or a network 21. The databases 19a, 19b may be connected to and/or in communication with the servers 17a, 17b via the network 21. As a result, the communication device 3, the screen 7 and/or the memory 11 may be connected to and/or in communication with the servers 17a, 17b and/or the databases 19a, 19b via the network 21.

The network 21 may be any type of computer network that may interconnect the servers 17a, 17b, the databases 19a, 19b, the communication device 3, the screen 7 and/or the memory 11. Of course, any number of servers, databases, communication devices, screens and/or memories may be connected to the network 21 and the invention should not be construed as limited as to a specific number of any of these components. Further, the network 21 may be, for example, an internet, a local area network (hereinafter "LAN network") and/or a wireless network. However, any network may be utilized that may be apparent to those skilled in the art. The present invention should not be deemed as limited to the embodiments of a specified network.

FIG. 2 illustrates a communication device 30 having an a screen 33 in another embodiment of the present invention. Preferably, the screen 33 is illuminating by a device known to one having ordinary skill in the art. The communication device 30 may be a portable handheld device, such as, for example, a personal digital assistant, a cellular telephone, a pager, a portable media player, an "iPod", a pedometer, a watch, a clock, a touch screen and/or the like. It should be understood that the communication device 30 may be any communication device that may have the screen 33 that may be implemented by one having ordinary skill in the art. The present invention should not be deemed as limited to the embodiments of a specific communication device 30.

The screen 33 may be, for example, a liquid crystal display, a fiber optic screen, a reflective flat panel display screen, a monochrome color display, a display screen with multiple diodes, a plasma screen, a touch screen or the like. The screen 33 may have a light emitting element, such as, for example, a light emitting diode or the like. The light emitting diode or a plurality of light emitting diodes may illuminate the screen. The present invention should not be deemed as limited to the embodiments of a specific screen 33. The screen 33 may be protected from scratches, dents, moisture and the like by a guard 35. The guard 35 may be made from, for example, plastic, glass, fiberglass or any other protective material that are generally known and may be implemented by one having ordinary skill in the art. The guard 35 may, for example, magnify and/or intensify the visual signal displayed on the screen 33. The present invention should not be deemed as limited to the embodiments of a specific guard 35.

The screen 33 may display a visual signal 31. The visual signal 31 may be, for example, text, such as, for example, "REFILL DRINKS." The visual signal 31 may be, for example, a symbol, such as, for example, a beer bottle. The symbol may have attributes to identify a particular good and/or a service. For example, the beer bottle may include attributes, such as, for example, a logo, brand name, color, and/or text. The visual signal 31 may be, for example, an advertisement, such as, for example, a logo that may identify a particular good and/or service. The visual signal 31 may be, for example, a color that may be used to request the good and/or service. For example, the visual signal 11 may be the color green to indicate that more goods and/or services are needed. It should be understood that the visual signal 31 may be any visual signal that may be used to request a good and/or a service by one having ordinary skill in the art. The visual signal 31 should not be deemed as limited to the embodiments described and may be any combination of the described embodiments. The visual signal 31 may include animations, such as, for example, flashing, sparkling, flickering, blinking, rotating, pulsating or the like.

The communication device 30 may have an information receptor, such as, for example, an antenna 39 for receiving and/or transmitting information between the communication device 30, the servers 17a, 17b and/or the databases 19a, 19b, as shown in FIG. 1. In another embodiment, the information receptor may be a data port, such as, for example, a universal serial bus ("USB") port (not shown). FIG. 2 shows the communication device 30 which may have a microphone 41 and/or a speaker 43. In addition, the communication device 30 may contain keys 45a-45e, such as, for example, a keyboard. The microphone 7 and/or keys 3a-3e may provide for communicating between the memory 11, the servers 17a, 117b, and/or the databases 19a, 19b as shown in FIG. 1.

The keys 45a-45e may input, for example, text, such as, for example, a username or a password to log into the server 132a. The keys 45a-45e may input, for example, numerals, such as, for example a quantity of the goods and/or the services requested. The keys 45a-45e may access, for example, applications, such as, for example, a program to display, receive, transmit, draw, edit and/or create the visual signal 11. The keys 45a-45e may provide an input means to, for example, brighten the visual signal 11, adjust the volume of the communication device or the like. The present invention should not be deemed as limited to the embodiments of a specific plurality of keys 45a-45e.

Figure 3:
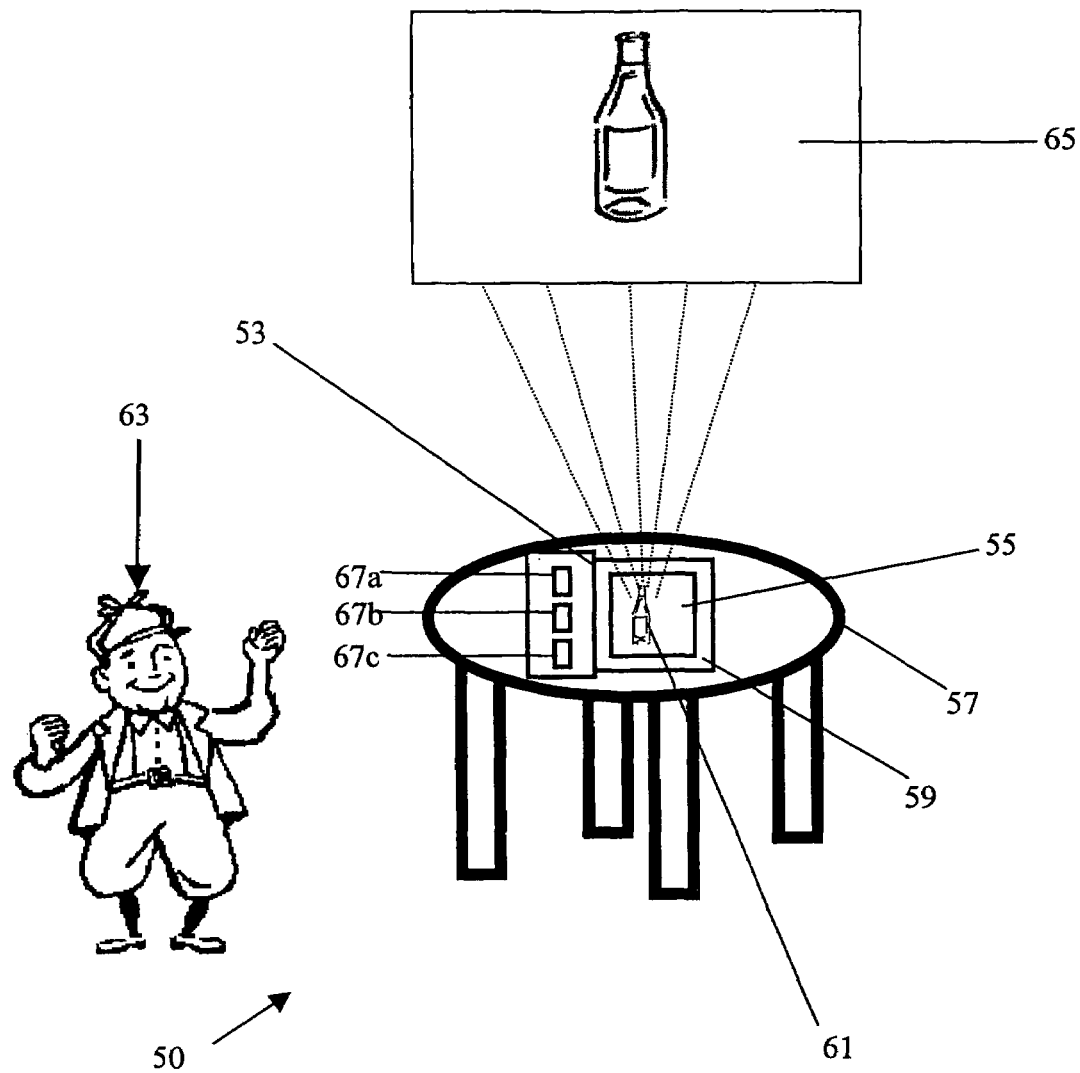
FIG. 3 illustrates a plan view of a communication device incorporating a screen in an embodiment of the present invention.

FIG. 3 illustrates a system 50 having a communication device 53 incorporating an screen 55 in another embodiment of the present invention. The communication device 53 may be a stationary device, such as, for example, a personal computer, a clock, a touch screen, a television and/or the like. It should be understood that the communication device 53 may be any communication device that may have a screen 55 implemented by one having ordinary skill in the art. The present invention should not be deemed as limited to the embodiments of a specific communication device 53.

The communication device 53 may be, for example, a personal computer, laptop computer, touch screen or the like. The communication device 53 may be connected to, attached to, and/or removably connected to a mounting device 57. The mounting device 57 may be, for example, a table, a desk, or the like. The present invention should not be deemed as limited to the embodiments of a specific mounting device 57.

The screen 55 may be, for example, a liquid crystal display, a fiber optic screen, a reflective flat panel display screen, a monochrome color display, a display screen with multiple diodes, a plasma screen, a touch screen or the like. A guard 59 may, for example, shield the screen 55. The guard 59 may be a protective layer, such as, for example, a plate of glass, plastic, laminate or the like.

The screen 55 may display a signal 61. The signal 61 may be, for example, a visual signal and/or an audio signal. The audio signal may be, such as, for example, music, spoken words, audio tones and/or the like. For example, the audio signal may be, for example, a voice speaking "Bring me a beer". The visual signal 61 may be, for example, a logo, a trademark, a brand name and/or a description of the good and/or service requested by the user 63. The visual signal 61 may be a pictorial representation of a good and/or the a service requested by the user 63, such as, for example, a logo, a trademark, a sketch, a picture, a photograph, or the like. The visual signal may be, for example, a beer bottle. The visual signal 61 may be unique to the good and/or the service requested by the user 63. The present invention should not be deemed as limited to the embodiments of a specific signal 61.

The signal 61 may be displayed, transmitted and/or emitted to a display surface 65. For example, the signal 61 may be a visual signal projected onto the display surface 65 by, for example, a light emitting diode, a liquid crystal display projector or the like. The display surface 65 may be an opaque surface, such as, for example, a wall, a screen, a counter top, ceiling or the like. The present invention should not be deemed as limited to the embodiments of a specific display surface 65. It should be understood that the signal 61 may be any signal that may aid in obtaining requested goods and/or services by one having ordinary skill in the art.

In addition, the communication device 53 may have keys 67a-67c which may be activated by, for example, touching moving, sliding, pushing, depressing and/or the like. The user 63 may activate the keys 67a-67c to access and/or to communicate with the memory 11, the servers 17a, 17b, and/or the databases 19a, 19b, as shown in FIG. 3. The user 63 may be, such as, for example, a customer, a merchant or the like.

Figure 4:
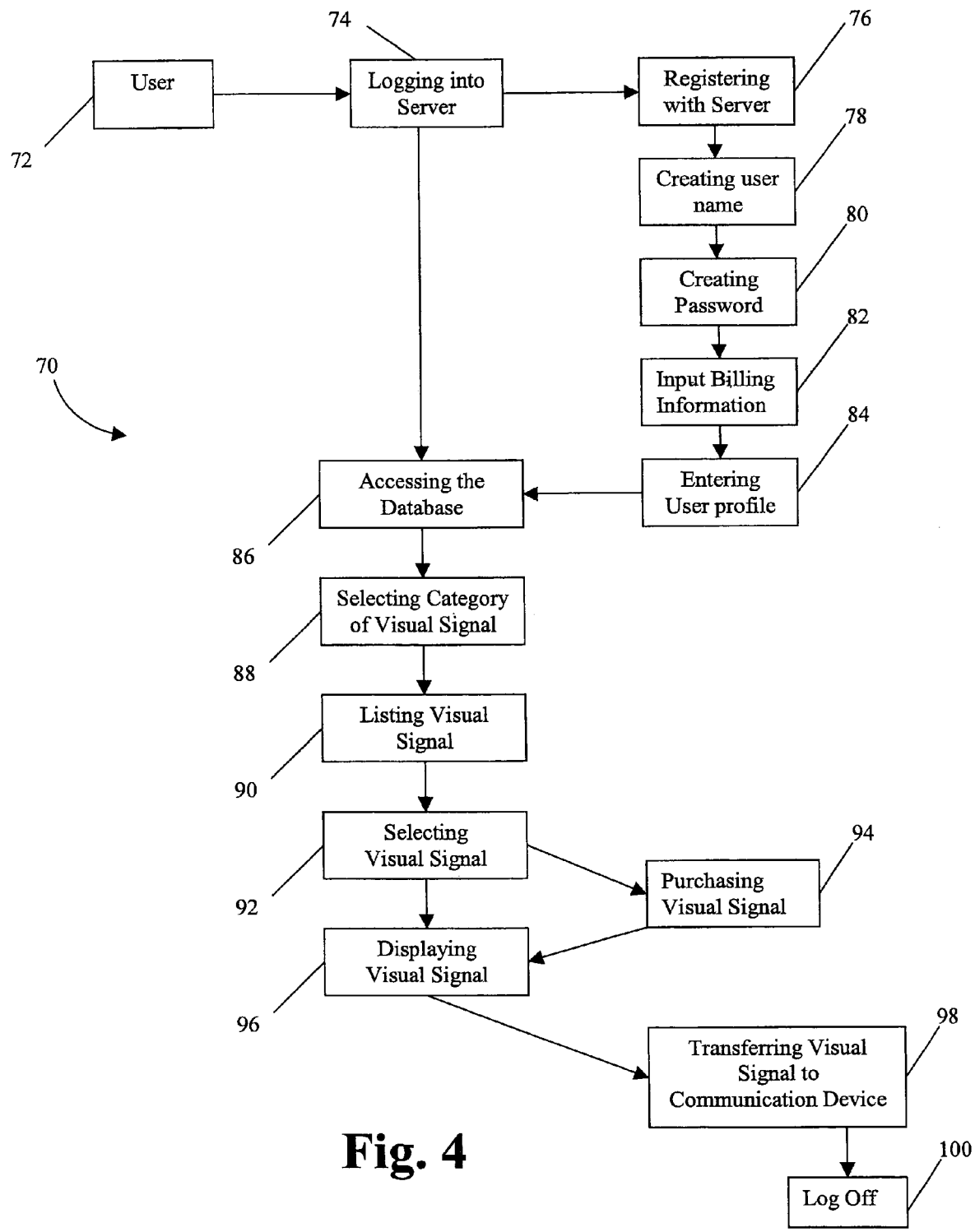
FIG. 4 illustrates a flowchart showing steps of a method of an embodiment the present invention.

FIG. 4 illustrates a flowchart 70 of steps for displaying, receiving, purchasing and/or transmitting the visual signal 31 in an embodiment of the present invention. The user 63 may access, connect to, communicate with and/or log into a server, such as, for example, the servers 17a, 17b as shown at step 74. The user 63 may register with the server 17a, as shown at step 76, by inputting information into the communication device 30 via the keys 45a-45e. The user 63 may, for example, register with the server 17a, as shown at step 76. The user 63 may register with the server 76a if, for example, the user 63 is accessing the server 76a for the first time. The user 63 may create a user name and/or a password, as shown at steps 78 and 80, respectively. The user name and/or the password may allow the user 63 to access, to communicate with and/or to log into the server 17a. The user name and/or password may limit a level of access to the database 17a which may be in communication with the server 17a.

The user 63 may input billing information, such as, for example, information relating to purchasing, as shown at step 82. The billing information may be, for example, credit card information, bank account information, payment methods, information relating to where to send an invoice and/or the like. The databases 19a, 19b may store the billing information of the user 63.

The user 63 may enter profile information as shown at step 84 by, for example, completing a questionnaire, which may include, for example, a series of questions. The user 63 may input personal information, such as, for example, name, age, sex, address, telephone number and/or the like. Next, the user 63 may input information relating to the communication device 30, such as, for example, a type of communication device 30, a location of the communication device 30 and/or the like. The user 63 may input, for example, information relating to the particular tastes and preferences of the user 63 by, for example, answering a series of questions relating to, for example, a favorite food, beverage, restaurant and/or the like. The particular tastes and preferences of the user 63 may be determined using an algorithm to analyze the responses of the user to a series of questions.

Generally, the profile information may specify parameters for a search to be conducted within the databases 19a, 19b. The search may, for example, present information for a merchant to access regarding users, such as, for example, the user 63. A merchant may enter data relating to the visual signal 31 and/or the good and/or the service of the merchant, such as, for example, a location, a title, a description, a brand name, a product name and/or the like into a search engine. The search engine may access the information relating to the visual signal 31 which may include, for example, information relating to users of the visual signal 31, such as, for example, a quantity of users accessing the visual signal 31, the profile of the users accessing the visual signal 31, reviews of the good and/or the service of the merchant from users and/or the like. For example, the merchant may enter the name of a product into the search engine. The search engine may access and/or display users who have displayed the visual signal 31 relating to the product.

The merchant may use the information from the search engine to transmit a related visual signal, an advertisement which may be personalized, a coupon for the good and/or the service associated with the visual signal 31 and/or the like to the user 63 via the server 17a and/or the communication device 30. The merchant may communicate with the user 63 via the server 17a and/or communication device 30 to advertise a similar good and/or the service that may be of interest to the user 63. The merchant may, for example, provide personalized advertisements to the user 63 via the server 17a and/or the communication device 30.

The search engine may be used to locate and/or access the visual signal 31. For example, the user 63 may input information relating to the visual signal 31, such as, for example, name of the good and/or service, manufacturer and/or producer of the product, description of the good and/or product, characteristics of the visual signal 31 and/or the like.

After logging into the server 17a, as shown at step 74, or registering with the server 17a, as shown at step 76, the user 63 may access the databases 19a and/or 19b, as shown at step 86. The databases 19a, 19b may store information regarding users, such as, for example, billing information, personal information, preference information, and/or the like. The databases 19a, 19b may store information, such as, for example, information relating to users who access a specific visual signal 31. Further, the server 17a may, for example, limit access to a portion of the databases 19a, 19b based on the user 63.

The user 63 may select a category of the visual signal 31, such as, for example, a type of good and/or service, a location of a good and/or a service and/or the like, as shown at step 88. The categories may be organized alphabetically. For example, the user 63 may select a category of goods, such as, for example, soft drinks. The category of the good and/or the service may have subcategories. For example, the category of soft drinks may, for example, have a subcategory which may be, for example, the type of soft drink, such as, for example, diet soft drinks. The user 63 may input information relating to the visual signal 31 into the search engine to locate a category. For example, the user 63 may input a description of a good and/or a service, a logo description, a brand name and/or the like to search the information stored on the databases 19a, 19b.

The communication device 30 may list visual signals within a category of visual signals, as shown at step 90. The list of the visual signals may be organized by, for example, name of the producer, name of merchant, description of the visual signal 11, type of good and/or service or the like.

The user 63 may then select the visual signal 31 to display on the communication device 30, as shown at step 96. The administrator of the server 17a may charge a fee for accessing, transferring and/or displaying the visual signal 31. As a result, the user 63 may purchase the visual signal 31, as shown at step 94, by, for example, inputting credit card information of the user 63, accessing the billing information of the user profile and/or the like. The user 63 may purchase the visual signal 31 by, for example, paying a fee. The fee may be, for example, a one-time fee, a monthly fee and/or the like. The user 63 may pre-pay for visual signals, such as, for example, by paying a monthly fee for unlimited visual signals, paying for a given number of visual signals in advance, or the like. The user 63 may agree to display the visual signal 31 for a given time in order to, for example, advertise the good and/or the service for a manufacturer, a merchant or the like. A company, merchant, advertising company or the like may agree to pay the fee for the visual signal 31. The user 63 may display the visual signal 31, as shown at step 96. The visual signal 31 may be displayed by the screen 33 of the communication device 30.

The visual signal 31 may be transferred to the memory 11 of the communication device 30, as shown at step 98. The memory 11 may store the visual signal 31 so the user 63 may again display and/or access the visual signal 31. The visual signal 31 may be displayed by the communication device 30 via the databases 19a and/or 19b. The visual signal stored in the memory 145 may be accessed without communication with the server 17a.

In use, the user 63 may, for example, bring the communication device 30 into a business establishment, such as, for example, a restaurant. The restaurant may have the communication device 53. The restaurant may provide access to the server 17a to display visual signals related to the goods and/or the services of the restaurant. The restaurant may provide the user 63 with a username and/or password to log into the server 17a. The username and/or password may allow the user 63 to access the server 17a for a given period of time. The user 63 may access the server 17a and select a visual signal 31 to display on the communication device 30. Alternatively, the communication device 30 may display the visual signal 31 without accessing the server 17a.

The visual signal 31 may request the good/and or service the user 63 desires from, for example, the restaurant. The user 63 may display the visual signal 31 on the communication device 30 to request the good and/or the service. The user 63 may transmit the visual signal 31 to a second communication device. The restaurant, for example, may access the second communication device to view the visual signal 31 transmitted by the user 63. Upon viewing and/or accessing the visual signal 31, an employee of the restaurant may obtain, prepare and/or deliver the good and/or the service to the user 63.

After the user 63 has purchased the visual signal 11 or has completed use of the server 17a, the user 63 may log off the server 17a as shown at step 100. Alternatively, the user 63 may return to step 86 or to any other step in the flowchart 70.

Figure 5:
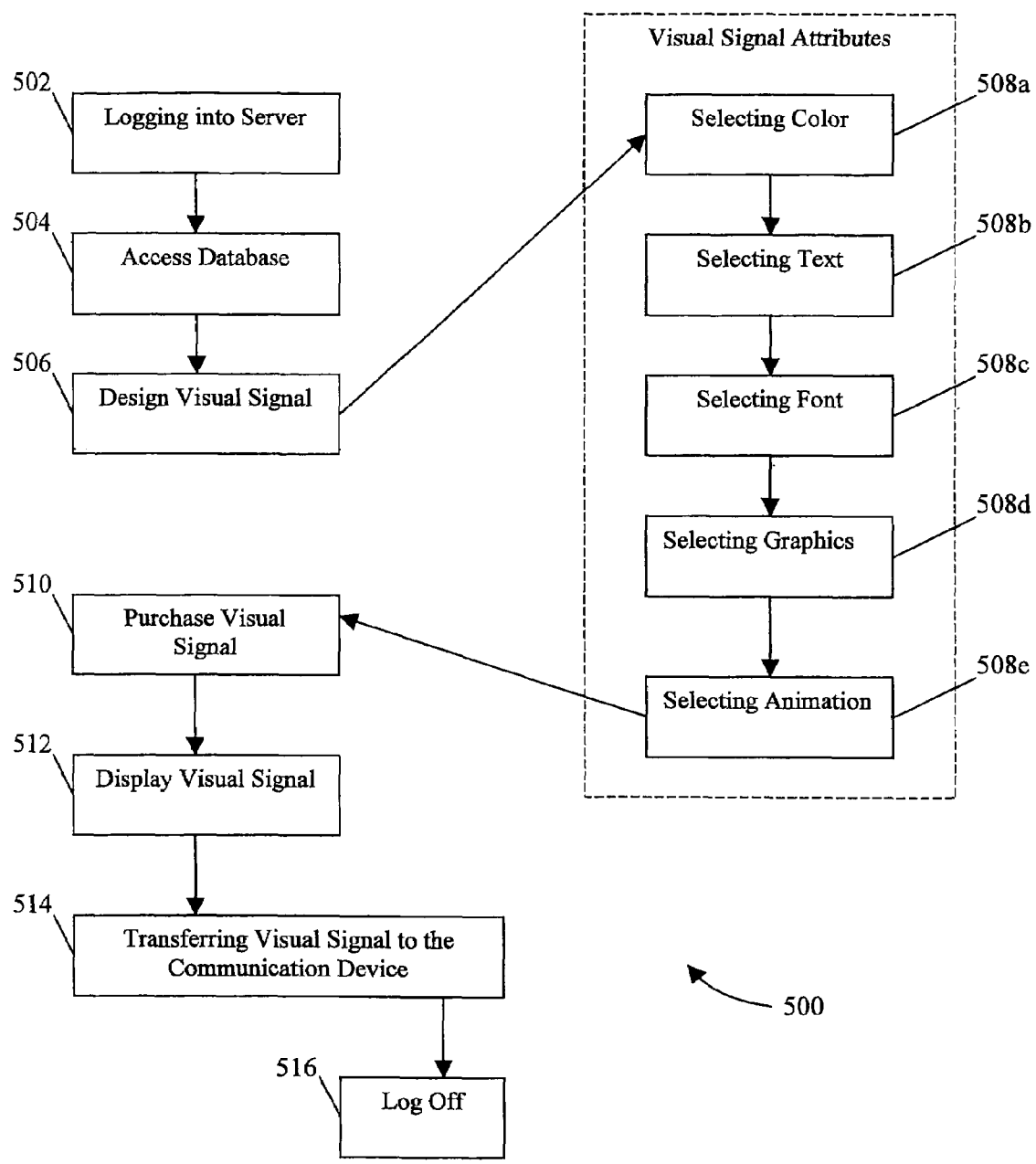
FIG. 5 illustrates a flowchart showing steps of a method of an embodiment the present invention.

FIG. 5 illustrates a flowchart 500 showing an embodiment of steps for designing, for displaying, for receiving, for purchasing and/or for transmitting a visual signal 31 in an embodiment of the present invention. The user 63 may log into the server 17a to access and/or to communicate with the database 19a as shown at step 504. The database 19a may store information, such as, for example, information relating to the creation, design and/or the like of the visual signal 31. For example, the database 19a may store an application, such as, for example, a computer program, to design, to transfer, to modify and/or to create the visual signal 31. The database 19a may store information associated with the user 63, such as, for example, personal information of the user 63, billing information of the user 63, purchase history of the user 63, preferences of the user 63 and/or the like. The database 19a may allow a user 63, for example, a merchant to design, to transfer and/or to create the visual signal 31 relating to the good and/or the service provided by the merchant.

The user 63 may elect to design, to create, to modify and/or to transfer the visual signal 31 to the database 19a as shown at step 506. The user 63 may transfer the visual signal 31 to the databases 19a, 19b via the communication device 30.

The user 63 may allow users of the servers 17a, 17b to access the visual signal 31 via the databases 19a, 19b and/or network 21. The user 63 may, for example, create, design and/or transfer the visual signal 31 to the databases 19a, 19b via the servers 17a, 17b. Consequently, an administrator of the servers 17a, 17b may pay the user 63 for creating, for designing and/or for transferring the visual signal 31 to the servers 17a, 17b. The administrator may pay the user 63 by crediting an account of the user, sending a check to the user 63 or the like. The user 63 may be compensated by, for example, sharing in profits from future purchases of the visual signal 31, crediting the user 63 with transfers of visual signals stored on the databases 19a, 19b at no cost or, for example, a reduced cost and/or the like.

The user 63 may select attributes to design the visual signal 31 as shown at steps 508a-508e. The user 63 may, for example, select a color as shown at step 508a. The color may be, for example, the color of a background, the color of the text and/or the color of any other attribute of the visual signal 31 that may be apparent to one of ordinary skill in the art.

The databases 19a, 19b, the communication device 30 and/or the memory 11 may have a plurality of colors for the user 63 to select. The user 63 may create a color by selecting colors stored, for example, on the database 19a at a given ratio to create a new color. The user 63 may select text as shown at step 508b that may be stored on the database 19a.

The user 63 may input text to create, to modify and/or to edit the visual signal 31. The text may include letters, numbers, symbols and/or the like. For example, the text may be a number, such as, for example, a bid number identifying the user 63 at an event, such as, for example, an auction. In another embodiment, the text may describe the good and/or the service requested by the user 63, such as, for example, "MORE NAPKINS PLEASE", and/or the like. Further, the text may identify a product by name, brand, or the like. Still further, the text may include a word, such as, for example, "HELP". The user 63 may select a given font for the text as shown at step 508c. The font may be any font apparent to one of ordinary skill in the art.

The user 63 may select graphics for the visual signal 31 as shown at step 508d. The graphics may be a pictorial representation of the good and/or the service requested by the user 63, such as, for example, a bottle, a emergency sign, a food and/or the like. The graphics may add to the appearance of the visual signal 31, such as, for example, a border for the visual signal 31.

The user 63 may select animation relating to the visual signal 31 as shown at step 508e. The animation may be a movement of the visual signal 31, such as, for example, flashing, blinking, intensifying and/or the like of the visual signal 31. The animation may, for example, be repeated, until, for example, the good and/or the service is attained.

After designing, creating, modifying and/or transferring the visual signal 31, the user may purchase the visual signal 31 as shown at step 510. In an embodiment of the present invention, a merchant may design, create, modify and/or transfer the visual signal 31 relating to a good and/or a service offered by the merchant. The merchant may pay a purchase fee for storing the visual signal 31 on the databases 19a, 19b.

After the visual signal 31 is designed, edited, and/or modified, the visual signal 31 may be displayed on the communication device 30 as shown at step 512. In an embodiment of the present invention, the user 63 may display the visual signal 31 on the screen 33 of the communication device 30.

After the user 63 has purchased the visual signal 31 or has completed use of the server 17*a*, the user 63 may log off from the server 17*a* as shown at step 516. Alternatively, the user 63 may return to step 506 or to any other step in the flowchart 500.

The communication device 53 and/or the system 50 may display the signal 61 to request the good and/or the service. The system 50 and/or the method may have a communication device having a screen 55 to display, to transmit and/or to design the signal 61. The communication device 53 may access a database 19*b* to display, to design, to store and/or to transfer the signal 61 to the communication device 53. The communication device 30 may have a memory 11 to store the signal 61. The signal 61 may have characteristics associated with the good or the service, identify the good or the service and/or describe the good or the service. As a result, the good and/or the service may be provided to the user 63 of the communication device 53.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for transmitting a signal wherein the signal is transmitted by a user to request a good or a service provided by a merchant wherein the user requests the good or the service by the transmission of the signal, the apparatus comprising:
    a memory that stores a plurality of signals associated with a plurality of merchants wherein each of the plurality of signals is associated with a corresponding one of the good or the service provided by the plurality of merchants and further wherein each of the signals is associated with data provided by the plurality of merchants wherein the memory stores the data;
    an input means connected to the memory; and
    a screen that displays a request for information wherein the user provides the information using the input means and further wherein the information indicates a location of the user wherein the memory determines selected signals of the plurality of signals based on comparison of the information to the data and further wherein the data of the selected signals corresponds to the information and further wherein a portion of the data of the selected signals corresponds to the location wherein the memory transmits the selected signals to the screen and further wherein the screen displays the selected signals wherein the user selects the signal from the selected signals using the input means and further wherein the signal has a visual representation of the good or the service wherein the screen displays the visual representation associated with the signal in response to selection of the signal from the selected signals wherein the memory, the input means and the screen are provided by a cellular telephone.

2. The apparatus of claim 1 wherein the signal is based on comparison of the information provided by the user to data about other users who have selected signals from the plurality of signals and further wherein the memory stores the data about the other users.

3. The apparatus of claim 1 further comprising:
    a modified signal displayed by the screen wherein the modified signal is created using the signal and user input using the input means and further wherein the modified signal is different than the signal.

4. The apparatus of claim 1 wherein the input means is a microphone attached to the cellular telephone and further wherein the signal is based on user input using the microphone.

5. The apparatus of claim 1 wherein the merchant is a restaurant.

6. The apparatus of claim 1 further comprising:
    a light emitting element connected to the memory wherein the light emitting element illuminates the signal.

7. A system for a user to display a symbol to request a good or a service provided by a merchant, the system comprising:
    a cellular telephone having a screen to display the symbol wherein the symbol provides a graphic representation of the good or the service and further wherein the symbol is not text;
    a server in communication with the cellular telephone;
    a database connected to the server wherein the database is remote with respect to the cellular telephone and further wherein the database stores the symbol and information related to the merchant; and
    a network in remote communication with the server wherein the server accesses the symbol in response to user input from using the cellular telephone and further wherein the user provides the user input usinq the cellular telephone wherein the server transfers the symbol to the cellular telephone from the database wherein the information related to the merchant associated with the symbol corresponds to the user input and further wherein the screen of the cellular telephone displays the symbol.

8. The system of claim 7 wherein the information indicates preferences of the user and further wherein the information related to the merchant associated with the symbol corresponds to the preferences.

9. The system of claim 7 wherein the symbol is displayed by the screen of the cellular telephone at a first time and further wherein the symbol is stored by the cellular telephone for display at a second time subsequent to the first time wherein the symbol is displayed at the second time without accessing the database.

10. The system of claim 7 wherein the cellular telephone emits an audio message when displaying the symbol.

11. The system of claim 7 wherein the user inputs a review of the good or the service using the cellular telephone and further wherein the review is transmitted to the merchant.

12. The system of claim 7 wherein the user input indicates a category and further wherein the information related to the merchant associated with the symbol corresponds to the category.

13. The system of claim 7 wherein the merchant is selected from a plurality of merchants by the user input.

14. A method for displaying a visual representation of a good or a service to request the good or the service from a first user wherein a second user requests the good or the service, the method comprising the steps of:
    providing a portable handheld device with a display means to display the visual representation;
    accessing a server in communication with the portable handheld device wherein the server is remote with respect to the portable handheld device;
    accessing a database in communication with the server wherein the database is remote with respect to the portable handheld device and further wherein the database stores a plurality of visual representations;

selecting the visual representation from the plurality of visual representations wherein the second user selects the visual representation using the portable handheld device;

transferring the visual representation from the database to the portable handheld device in response to selection of the visual representation from the plurality of visual representations by the second user;

modifying the visual representation based on user input using the portable handheld device wherein modifying the visual representation generates a modified visual representation that is different than the visual representation; and displaying the modified visual representation via the display means to request a good or a service provided by the first user wherein the good or the service is requested by the second user.

15. The method of claim 14 wherein the modified visual representation has a different color relative to the visual representation.

16. The method of claim 14 wherein the modified visual representation has different text relative to the visual representation.

17. The method of claim 14 wherein the server limits access to the database based on the identity of the second user.

18. The method of claim 14 wherein the modified visual representation has animation that moves the modified visual representation relative to the screen.

19. The method of claim 14 further comprising the step of:
storing the modified visual representation in the database wherein a third user that is a different user than the first user and the second user accesses the modified visual representation from the database using an additional portable handheld device located remote from the portable handheld device and further wherein the additional portable handheld device displays the modified visual representation.

20. The method of claim 14 further comprising the step of:
displaying reviews by other users who have obtained the good or service wherein the reviews are displayed to the second user before modifying the visual representation.

* * * * *